(12) United States Patent  (10) Patent No.: US 7,541,060 B2
Yang et al.  (45) Date of Patent: Jun. 2, 2009

(54) BICHROMAL BALLS

(75) Inventors: San-Ming Yang, Mississauga (CA);
Thomas Edward Enright, Tottenham (CA); Aurelian Valeriu Magdalinis, Aurora (CA); Ahmed Abd Alzamly, Mississauga (CA); Man-Chung Tam, Mississauga (CA); Carol Ann Jennings, Toronto (CA); Peter M. Kazmaier, Mississauga (CA); Marko D. Saban, Etobicoke (CA); Michael Steven Hawkins, Cambridge (CA)

(73) Assignee: Xerox Corporation, Norwalk, CT (US)

( * ) Notice: Subject to any disclaimer, the term of this patent is extended or adjusted under 35 U.S.C. 154(b) by 921 days.

(21) Appl. No.: 10/919,814

(22) Filed: Aug. 17, 2004

(65) Prior Publication Data

US 2006/0040050 A1   Feb. 23, 2006

(51) Int. Cl.
*B05D 7/00* (2006.01)
(52) U.S. Cl. .............. 427/212; 264/8; 264/5; 264/10; 264/203; 264/210.7; 264/210.8; 427/222; 427/213.34; 428/323; 428/40.2; 428/38; 210/137; 359/296
(58) Field of Classification Search ............... 264/8, 264/203, 210.7; 359/296; 428/195; 210/367
See application file for complete search history.

(56) References Cited

U.S. PATENT DOCUMENTS 4,126,854 A    11/1978  Sheridon
5,262,098 A *  11/1993  Crowley et al. ............ 264/8
5,342,567 A *   8/1994  Chen et al. .............. 264/203
5,344,594 A     9/1994  Sheridon
5,604,027 A     2/1997  Sheridon
5,717,514 A     2/1998  Sheridon
5,739,801 A     4/1998  Sheridon
5,754,332 A     5/1998  Crowley
5,808,525 A     9/1998  Tanno et al.
5,815,306 A     9/1998  Sheridon et al.
5,825,529 A    10/1998  Crowley
5,900,192 A     5/1999  Richley
5,976,428 A    11/1999  Richley
5,989,629 A    11/1999  Sacripante et al.
6,054,071 A     4/2000  Mikkelsen, Jr.
6,235,395 B1    5/2001  Sacripante et al.
6,419,982 B2    7/2002  Sacripante et al.
6,445,490 B1    9/2002  Chopra et al.
6,480,322 B2 * 11/2002  Engler et al. ............. 359/296
6,497,942 B2 * 12/2002  Sheridon et al. ......... 428/195.1
6,703,074 B2    3/2004  Sacripante et al.
2002/0094377 A1* 7/2002 Sacripante et al. ........ 427/222

FOREIGN PATENT DOCUMENTS

WO    WO 02/28916 A2 *  9/2001

* cited by examiner

*Primary Examiner*—Michael Barr
*Assistant Examiner*—Andrew Bowman
(74) *Attorney, Agent, or Firm*—Eugene O. Palazzo; Fay Sharpe LLP

(57) ABSTRACT

Disclosed is a technique for producing bichromal balls that are adapted for use in high temperature applications. The bichromal balls find particular application in signs and display devices that can be used in environments in which the temperature exceeds 40° C.

7 Claims, 2 Drawing Sheets

BICHROMAL BALLS

BACKGROUND

The present disclosure relates, in various exemplary embodiments, to high temperature applications for bichromal balls and related signage or displays utilizing the same. The disclosure finds particular application in conjunction with reusable display technology and "electric paper," which is electronically writeable and erasable and will be described with particular reference thereto. However, it is to be appreciated that the present exemplary embodiments are amenable to other like applications.

Bichromal balls, or beads as sometimes referred to in the art, are tiny spherical balls, such as micron-sized wax beads, which have an optical and an electrical anisotropy. These characteristics generally result from each hemisphere surface or side having a different color, such as black on one side and white on the other, and electrical charge, i.e., positive or negative. Depending on the electrical field produced, the orientation of these beads will change, showing a different color (such as black or white) and collectively create a visual image.

In this regard, the spherical particles are generally embedded in a solid substrate with a slight space between each ball. The substrate is then filled with a liquid (such as an oil) so that the balls are free to rotate in a changing electrical field, but can not migrate from one location to another. If one hemisphere is black and the other is white. Each pixel can be turned on and off by the electrical field applied to that location. Furthermore, each pixel can be individually addressed, and a full page image can thus be generated.

For example, reusable signage or displays can be produced by incorporating the tiny bichromal beads in a substrate such as sandwiched between thin sheets of a flexible elastomer and suspended in an emulsion. The beads reside in their own cavities within the flexible sheets of material. Under the influence of a voltage applied to the surface, the beads will rotate to present one side or the other to the viewer to create an image. The image stays in place until a new voltage pattern is applied using software, which erases the previous image and generates a new one. This results in a reusable signage or display that is electronically writable and erasable.

Furthermore, electronic displays produced by these bichromal balls or beads are sometimes referred to as "gyricon" displays. This terminology is reportedly the result of a combination of the Greek word for "rotating" and the Latin word for "image."

Numerous patents describe bichromal balls, their manufacture, incorporation in display systems or substrates, and related uses and applications. Exemplary patents include, but are not limited to: U.S. Pat. Nos. 5,262,098; 5,344,594; 5,604,027 reissued as Re 37,085; 5,708,525; 5,717,514; 5,739,801; 5,754,332; 5,815,306; 5,900,192; 5,976,428; 6,054,071; 5,989,629; 6,235,395; 6,419,982; 6,235,395; 6,419,982; 6,445,490; and 6,703,074; all of which are hereby incorporated by reference. In addition, disclosure is provided by U.S. Pat. Nos. 4,126,854; and 5,825,529; and N. K. Sheridon et al., "The Gyricon—A twisting ball display", Proc. SID, Boston, Mass., 289, 1977; T. Pham et al., "Electro-optical characteristics of the Gyricon display", SID '02 Digest, 199, 2002; which again are hereby incorporated by reference.

Gyricon displays, or those based upon bichromal balls, are mainly used for indoor electronic signage applications. Outdoor applications are limited because the base polymer used in Gyricon media is a nonfunctional polyethylene, such as POLYWAX® 1000 or POLYWAX® 2000 from Baker Petrolite Corporation, Sugarland, Tex. The reason for the limited application is that at higher temperatures, it is believed that a fraction of the POLYWAX® leaches out to silicone fluid typically utilized inside the device, such as at about 50° C. to about 60° C. These unwanted materials are then carried or dispersed in the silicone fluid, thereby hindering bead rotation. As a result, the optical performances of the devices are significantly reduced. At present, the application temperature must generally be maintained below about 40° C. by various cooling methods and there is no very successful method to prevent the noted leaching difficulties described generally above.

Accordingly, there is a need for a bichromal ball display and related techniques for producing the same, that can be used at relatively high temperatures, and which avoids the problems associated with currently known displays.

BRIEF DESCRIPTION

In accordance with one aspect of the present disclosure, a process is provided for forming bichromal balls adapted for use in high temperature applications. The process comprises providing a polyalkylene wax and an organic solvent, and extracting the polyalkylene wax with the organic solvent to yield a purified polyalkylene wax. The process further comprises forming bichromal balls from the purified polyalkylene wax, to thereby produce the bichromal balls adapted for use in high temperature applications.

In yet another aspect, the disclosure provides a process for forming bichromal balls adapted for display applications for use at temperatures greater than 40° C. The process comprises providing a polyalkylene wax, such as a polyethylene wax, and an organic solvent, such as an isoparaffin solvent, and extracting the wax with the solvent at a temperature greater than about 60° C., preferably greater than about 80° C., to remove a fraction of the wax from a remaining purified portion of the wax. The fraction has an average molecular weight less than the average molecular weight of the purified portion of the wax. The process also comprises forming bichromal balls adapted for display applications at temperatures greater than 40° C. from the purified portion of the wax.

These and other non-limiting aspects and/or objects of the exemplary embodiments are more particularly disclosed below.

BRIEF DESCRIPTION OF THE DRAWINGS

The following is a brief description of the drawings, which are presented for the purposes of illustrating one or more of the exemplary embodiments disclosed herein and not for the purposes of limiting the same.

DETAILED DESCRIPTION

Figure 1:
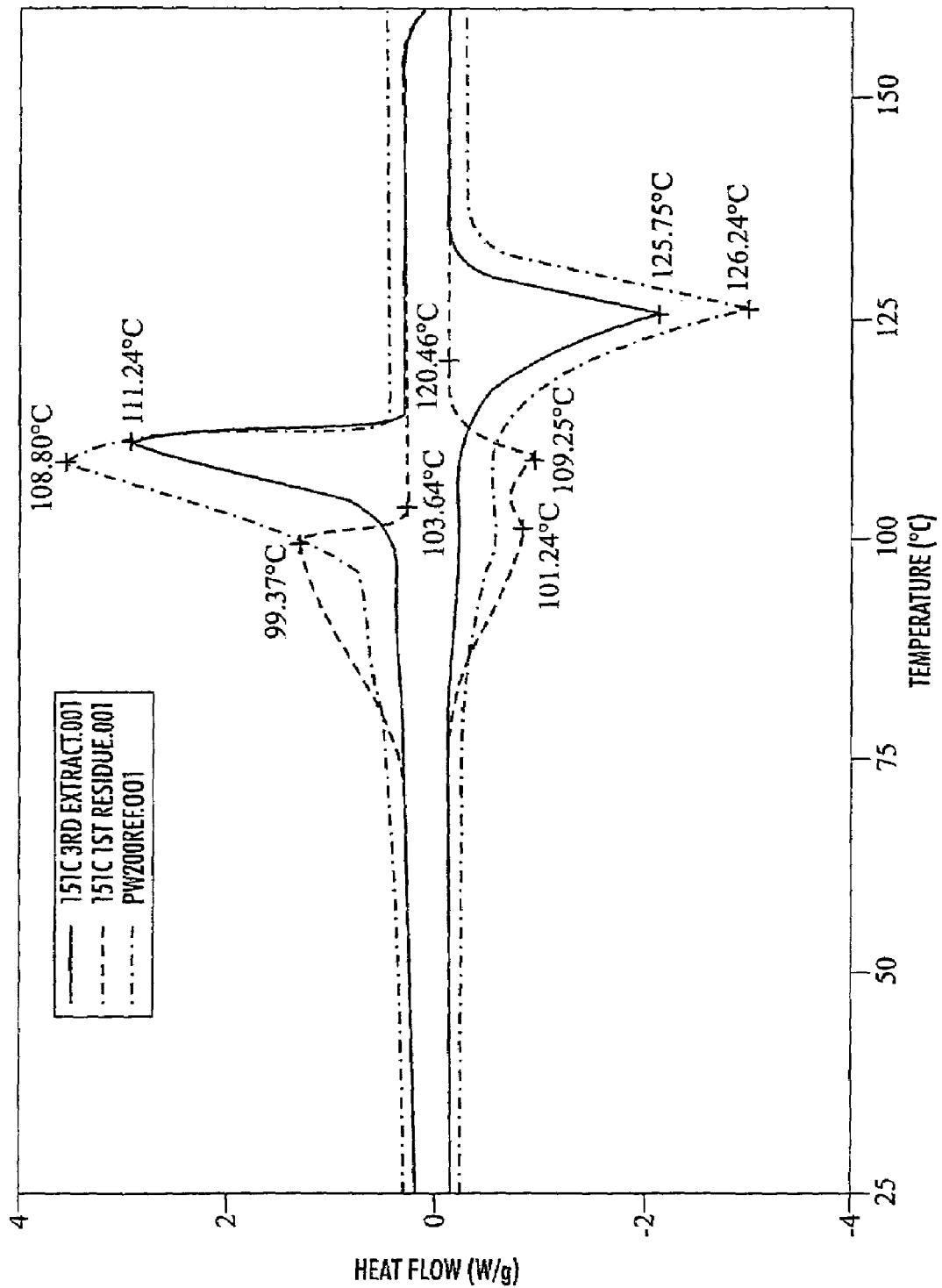
FIG. 1 is a graph of heat flow as a function of temperature for a polyalkylene wax undergoing an extraction operation as described herein.

The present disclosure provides, in various exemplary embodiments, the processes and procedures for purifying a polyalkylene wax, and particularly a polyethylene wax, by solvent extraction. The purified polyalkylene wax is then incorporated into bichromal balls or beads to produce a bichromal ball display. The resulting displays are suitable for use in high temperature applications.

In this regard, a polyalkylene wax, such as a blend of polyethylene waxes having different molecular weights, is suspended in a hot (i.e., from about 60° C. to about 100° C., and generally at about 80° C.) organic solvent, such as an isoparaffin solvent, for several hours (i.e., from about 1 hour to about 12 hours), followed by a hot extraction and/or filtration. This procedure may be repeated one or more times. The extracted materials are identified as low molecular weight waxes (i.e., from about 300 to about 700 molecular weight polyalkylenes) by DSC. The remaining purified waxy solids can then be mixed with pigment and utilized for producing bichromal balls or beads. Pigmented wax beads or bichromal balls as generally referred to herein, made of purified polyalkylene wax (i.e., molecular weights from about 700 to about 3,000, including greater than about 1,000 molecular weight), have shown superior tolerance towards leaching in silicone oil at elevated temperatures.

As briefly mentioned above, the base polymer typically used in the production of Gyricon beads or bichromal balls is a crystalline polyethylene wax commercially available under the designation POLYWAX® 1000 (also designated as PW1000) from Baker Petrolite, Corp. The bichromal balls are typically embedded in a layer of a polydimethylsiloxane (PDMS) elastomer which is swollen by Dow Corning DC200 silicone fluid when incorporated into a display device or application. The performance of the resulting device is very good at ambient temperature. However, once the devices are heated beyond about 50° C. and then brought back to room temperature, the device performance is significantly reduced.

In accordance with the present exemplary embodiment, the cause of the above described diminished performance has been identified as resulting from a fraction of polyethylene wax dissolving into the silicone fluid inside the device at high temperatures. After cooling to room or ambient temperature, these leached materials are deposited back inside the device, which hinders the rotation of the bichromal balls.

Currently, no successful method to solve the above described problem is believed to be known. Accordingly, current Gyricon devices should be operated below 40° C. because polyethylene waxes such as PW1000 are highly soluble in DC200 silicone fluid at elevated temperatures.

Additionally, POLYWAX® 2000 (PW2000) is also a polyethylene wax made by Baker Petrolite. This material has also been used for producing bichromal balls because it has a higher melting point than PW1000 (126° C. vs 113° C.) and it is a good candidate for high temperature package. However, bichromal balls made of PW2000 did not show any improvements when utilized in devices at elevated temperatures. Further investigation revealed that even though the leaching of PW2000 is less than PW1000 under identical conditions, the relatively small amount of leached materials is still sufficient to hinder rotation of the bichromal balls.

The present disclosure concerns the use of solvent extraction to remove the soluble fraction of a polyalkylene wax used in the production of bichromal balls, such as for example PW2000. In the embodiments described herein, extraction is performed with a commercially available organic solvent, such as an isoparaffinic solution or solvent designated as ISOPAR®. The purified PW2000 has a superior tolerance to leaching than PW2000 prior to undergoing solvent extraction. Although not wishing to be bound to any particular theory, it is believed that upon extraction, the extracted portion of the wax has an average molecular weight that is less than the average molecular weight of the remaining portion of the wax.

The extraction operation may use a number of solvent extraction steps. That is, the number of extractions can range from about 1 to about 10 times; however, a number from 1 to 5 is typical. It may in certain applications be desirable to perform the extraction at elevated temperatures, such as for example at about 60° C. to about 100° C., and generally at about 800° C.

In addition, the present discovery relates to a process of making high temperature bichromal ball devices from a purified polyalkylene wax such as purified PW2000. That is, the bichromal ball is made of a 'purified' PW2000, for example. The purification process is a hot solvent extraction of virgin PW2000 by ISOPAR® C. at 85° C. The low molecular weight fraction of PW2000 is successfully removed. Bichromal ball devices of 'purified' PW2000 do not show optical degradation at 78° C. for time periods of over 120 hours.

In this regard, polyalkylene waxes, such as POLYWAX® 1000 and 2000, are generally low molecular weight homopolymers, which are 100% linear and saturated and characterized by a molecular weight distribution (Mw/Mn) of approximately 1.1. Because the POLYWAX polyethylenes are linear and have a narrow molecular weight distribution (MWD), physical properties are highly co-related, such that the melting point and hardness are reportedly controlled by molecular weight alone.

The production process of such waxes is controllable to the extent that desired molecular weight products are obtained predictably and consistently. Product with number average molecular weights from about 450 to about 3000, with corresponding melting points of 80° C. to 132° C., are commercially available. Due to their 100% linearity and narrow molecular weight distribution, POLYWAX® polyethylenes characteristically display high crystallinity and sharp melting points.

Typical properties of polyethylene waxes such as POLYWAX® 1000 are POLYWAX® 2000 and as follows:

|  | Molecular Weight | Density(g/cc) | Viscosity(cps) at 149 C. | Melting point/C. |
|---|---|---|---|---|
| POLYWAX 1000 | 1000 | 0.96 | 15 | 113 |
| POLYWAX 2000 | 2000 | 0.97 | 50 | 126 |

Other commercially available polyalkylenes include the Licowax™ product line available from Clariant, Luwax (BASF), and A-C Wax (Honeywell). Typical properties of these waxes are listed below:

|  | Melting point/C. |
|---|---|
| Clariant Licowax PE 130 | 125 |
| Clariant Licowax PE 190 | 135 |
| Clariant Licowax PE 520 | 120 |
| Honeywell A-C 810A | 121 |
| Honeywell A-C 820A | 126 |
| BASF Luwax AH6 | 112 |
| BASF Luwax AL61 | 113 |

In turn, the polyalkylene waxes are purified by hot extraction and/or filtration in organic solvent solutions, such as isoparaffin solutions. ISOPAR® is the brand name for various grades of high-purity isoparaffinic solvents with narrow boiling ranges, available from Exxon Corp. The exceptional purity of ISOPAR® is the basis for such desirable properties such as low odor, selective solvency, good oxidation stability, low electrical conductivity, and low skin irritation. The inherently low surface tension of ISOPAR® also imparts superior spreadability to formulations utilizing ISOPAR®. Other commercially available sources of isoparaffinic solvents can be used such as Ashpar from Ashland Chemical, Soltrol from CPChem, Shellsol (Shell Chemical).

Tables 1-8, set forth below, list various properties for the ISOPAR® grades.

TABLE 1

ISOPAR ® C

| | |
|---|---|
| Solvency | |
| Kauri-butanol value, ASTM D 1133 | 27 |
| Aniline Point, ° C.(° F.) | 78(173) |
| Volatility | |
| Flash Point, ASTM D 56, TCC, ° C.(° F.) | −8(18) |
| Distillation, ASTM D 86, IBP ° C.(° F.) | 98(208) |
| Distillation, ASTM D 86, Dry Point ° C.(° F.) | 104(219) |
| Specific Gravity, @ 15.6° C.(60° F.), ASTM D 1250 | 0.70 |
| Composition | |
| Saturates | 100 |
| Aromatics | <0.01 |
| Purity, ppm | |
| Acids | None |
| Chlorides | <3 |
| Nitrogen | — |
| Peroxides | 0 |
| Sulfur | 1 |
| Surface Properties | |
| Surface tension, dynes/cm @ 25° C.(77° F.), ASTM D 971 | 20.3 |
| Interfacial tension, @ 25° C.(77° F.) | 48.9 |
| Demulsibility | Excellent |

TABLE 2

ISOPAR ® E

| | |
|---|---|
| Solvency | |
| Kauri-butanol value, ASTM D 1133 | 29 |
| Aniline Point, ° C.(° F.) | 75(167) |
| Volatility | |
| Flash Point, ASTM D 56, TCC, ° C.(° F.) | 7(45) |
| Distillation, ASTM D 86, IBP ° C.(° F.) | 118(244) |
| Distillation, ASTM D 86, Dry Point ° C.(° F.) | 137(279) |
| Specific Gravity, @ 15.6° C.(60° F.), ASTM D 1250 | 0.72 |
| Composition | |
| Saturates | 100 |
| Aromatics | <0.01 |
| Purity, ppm | |
| Acids | None |
| Chlorides | <2 |
| Nitrogen | <2 |
| Peroxides | 0 |
| Sulfur | 1 |
| Surface Properties | |
| Surface tension, dynes/cm @ 25° C.(77° F.), ASTM D 971 | 22.1 |
| Interfacial tension, @ 25° C.(77° F.) | 48.9 |
| Demulsibility | Excellent |

TABLE 3

ISOPAR ® G

| | |
|---|---|
| Solvency | |
| Kauri-butanol value, ASTM D 1133 | 27 |
| Aniline Point, ° C.(° F.) | 83(181) |
| Volatility | |
| Flash Point, ASTM D 56, TCC, ° C.(° F.) | 41(106) |
| Distillation, ASTM D 86, IBP ° C.(° F.) | 160(320) |
| Distillation, ASTM D 86, Dry Point ° C.(° F.) | 176(349) |
| Specific Gravity, @ 15.6° C.(60° F.), ASTM D 1250 | 0.75 |
| Composition | |
| Saturates | 100 |
| Aromatics | <0.01 |
| Purity, ppm | |
| Acids | None |
| Chlorides | <1 |
| Nitrogen | <1 |
| Peroxides | Trace |
| Sulfur | 1 |
| Surface Properties | |
| Surface tension, dynes/cm @ 25° C.(77° F.), ASTM D 971 | 23.8 |
| Interfacial tension, @ 25° C.(77° F.) | 51.6 |
| Demulsibility | Excellent |

TABLE 4

ISOPAR ® H

| | |
|---|---|
| Solvency | |
| Kauri-butanol value, ASTM D 1133 | 26 |
| Aniline Point, ° C.(° F.) | 84(183) |
| Volatility | |
| Flash Point, ASTM D 56, TCC, ° C.(° F.) | 54(129) |
| Distillation, ASTM D 86, IBP ° C.(° F.) | 178(352) |
| Distillation, ASTM D 86, Dry Point ° C.(° F.) | 188(370) |
| Specific Gravity, @ 15.6° C.(60° F.), ASTM D 1250 | 0.76 |
| Composition | |
| Saturates | 100 |
| Aromatics | <0.01 |
| Purity, ppm | |
| Acids | None |
| Chlorides | <3 |
| Nitrogen | <1 |
| Peroxides | <1 |
| Sulfur | 1 |
| Surface Properties | |
| Surface tension, dynes/cm @ 25° C.(77° F.), ASTM D 971 | 24.1 |
| Interfacial tension, @ 25° C.(77° F.) | 51.4 |
| Demulsibility | Excellent |

TABLE 5

ISOPAR ® K

| | |
|---|---|
| Solvency | |
| Kauri-butanol value, ASTM D 1133 | 27 |
| Aniline Point, ° C.(° F.) | 83(181) |
| Volatility | |
| Flash Point, ASTM D 56, TCC, ° C.(° F.) | 57(135) |
| Distillation, ASTM D 86, IBP ° C.(° F.) | 178(351) |
| Distillation, ASTM D 86, Dry Point ° C.(° F.) | 197(387) |
| Specific Gravity, @ 15.6° C.(60° F.), ASTM D 1250 | 0.76 |
| Composition | |
| Saturates | 99.9 |
| Aromatics | <0.01 |

TABLE 5-continued

ISOPAR ® K

Purity, ppm

| | |
|---|---|
| Acids | None |
| Chlorides | 2 |
| Nitrogen | <1 |
| Peroxides | <1 |
| Sulfur | <2 |

Surface Properties

| | |
|---|---|
| Surface tension, dynes/cm @ 25° C.(77° F.), ASTM D 971 | 24.2 |
| Interfacial tension, @ 25° C.(77° F.) | 50.1 |
| Demulsibility | Excellent |

TABLE 6

ISOPAR ® L

Solvency

| | |
|---|---|
| Kauri-butanol value, ASTM D 1133 | 27 |
| Aniline Point, ° C.(° F.) | 85(185) |

Volatility

| | |
|---|---|
| Flash Point, ASTM D 56, TCC, ° C.(° F.) | 64(147) |
| Distillation, ASTM D 86, IBP ° C.(° F.) | 189(372) |
| Distillation, ASTM D 86, Dry Point ° C.(° F.) | 207(405) |
| Specific Gravity, @ 15.6° C.(60° F.), ASTM D 1250 | 0.77 |

Composition

| | |
|---|---|
| Saturates | 99.9 |
| Aromatics | <0.01 |

Purity, ppm

| | |
|---|---|
| Acids | None |
| Chlorides | <1 |
| Nitrogen | <1 |
| Peroxides | <1 |
| Sulfur | <2 |

Surface Properties

| | |
|---|---|
| Surface tension, dynes/cm @ 25° C.(77° F.), ASTM D 971 | 25.1 |
| Interfacial tension, @ 25° C.(77° F.) | 49.8 |
| Demulsibility | Excellent |

TABLE 7

ISOPAR ® M

Solvency

| | |
|---|---|
| Kauri-butanol value, ASTM D 1133 | 25 |
| Aniline Point, ° C.(° F.) | 91(196) |

Volatility

| | |
|---|---|
| Flash Point, ASTM D 56, TCC, ° C.(° F.) | 93(199) |
| Distillation, ASTM D 86, IBP ° C.(° F.) | 223(433) |
| Distillation, ASTM D 86, Dry Point ° C.(° F.) | 254(489) |
| Specific Gravity, @ 15.6° C.(60° F.), ASTM D 1250 | 0.79 |

Composition

| | |
|---|---|
| Saturates | 99.9 |
| Aromatics | <0.05 |

Purity, ppm

| | |
|---|---|
| Acids | None |
| Chlorides | — |
| Nitrogen | — |
| Peroxides | <1 |
| Sulfur | <2 |

TABLE 7-continued

ISOPAR ® M

Surface Properties

| | |
|---|---|
| Surface tension, dynes/cm @ 25° C.(77° F.), ASTM D 971 | 26.4 |
| Interfacial tension, @ 25° C.(77° F.) | 52.2 |
| Demulsibility | Excellent |

TABLE 8

ISOPAR ® V

Solvency

| | |
|---|---|
| Kauri-butanol value, ASTM D 1133 | 23 |
| Aniline Point, ° C.(° F.) | 92(198) |

Volatility

| | |
|---|---|
| Flash Point, ASTM D 56, TCC, ° C.(° F.) | 129(265) |
| Distillation, ASTM D 86, IBP ° C.(° F.) | 273(523) |
| Distillation, ASTM D 86, Dry Point ° C.(° F.) | 312(594) |
| Specific Gravity, @ 15.6° C.(60° F.), ASTM D 1250 | 0.83 |

Composition

| | |
|---|---|
| Saturates | 99.8 |
| Aromatics | <0.05 |

Purity, ppm

| | |
|---|---|
| Acids | None |
| Chlorides | 7 |
| Nitrogen | — |
| Peroxides | <1 |
| Sulfur | 1 |

Surface Properties

| | |
|---|---|
| Surface tension, dynes/cm @ 25° C.(77° F.), ASTM D 971 | 26.9 |
| Interfacial tension, @ 25° C.(77° F.) | 44.9 |
| Demulsibility | Excellent |

Other suitable organic solvents include halogenated hydrocarbons such as 1,3-dichlorobenzene (Aldrich), 1,2,4-trichlorobenzene (Aldrich), halocarbon 0.8 (Halocarbon Inc.), halocarbon 1.8 (Halocarbon Inc.), aromatic hydrocarbons such as toluene (Aldrich), xylene (Aldrich) and linear or branched hydrocarbons with carbon number from 8 to 20.

The purified polyalkylene wax, and particularly polyethylene wax, can be used in a bichromal ball production process. The resulting bichromal balls produced therefrom are particularly adapted for use in high temperature applications.

A typical process for forming the bichromal balls described herein is as follows. After purification, the purified polyalkylene wax is mixed with a first pigment to produce a first wax material. The purified polyalkylene wax is mixed with a second pigment to produce a second wax material. These mixing operations can be performed to produce many different wax materials, typically having different colors or other different properties as compared to the other materials.

Next, the wax materials prepared are then heated to a temperature greater than the highest melting temperature of the wax materials. The heating operations can be performed separately upon each of the wax materials or collectively. Upon the wax materials being heated to a suitable temperature such that the wax material flows, the materials are then deposited onto a spinning disk to produce bichromal balls adapted for use in high temperature applications. The spinning disk production method is described in one or more of the patents referenced herein.

The polymer or wax materials can be colored through the addition of pigments, dyes, light reflective or light blocking particles, etc., as it is commonly known in the art. In this regard, a "pigment" is defined herein to include any substance, usually in the form of a dry powder, which imparts color to another substance or mixture. Most pigments are insoluble in organic solvents and water; exceptions are the natural organic pigments, such as chlorophyll, which are generally organosoluble. To qualify as a pigment, a material must have positive colorant value. This definition excludes whiting, barytes, clays, and talc.

Pigments may be classified as follows:
I. Inorganic
  (a) metallic oxides (iron, titanium, zinc, cobalt, chromium).
  (b) metal powder suspensions (gold, aluminum).
  (c) earth colors (siennas, ochers, umbers).
  (d) lead chromates.
  (e) carbon black.
II. Organic
  (a) animal (rhodopsin, melanin).
  (b) vegetable (chlorophyll, xantrophyll, indigo, flavone, carotene).

Some pigments (zinc oxide, carbon black) are also reinforcing agents, but the two terms are not synonymous; in the parlance of the paint and rubber industries these distinctions are not always observed.

"Dyes" include natural and synthetic dyes. A natural dye is an organic colorant obtained from an animal or plant source. Among the best-known are madder, cochineal, logwood, and indigo. The distinction between natural dyes and natural pigments is often arbitrary.

A synthetic dye is an organic colorant derived from coal-tar- and petroleum-based intermediates and applied by a variety of methods to impart bright, permanent colors to textile fibers. Some dyes, call "fugitive," are unstable to sunlight, heat, and acids or bases; others, called "fast," are not. Direct (or substantive) dyes can be used effectively without "assistants"; indirect dyes require either chemical reduction (vat type) or a third substance (mordant), usually a metal salt or tannic acid, to bind the dye to the fiber.

A "colorant" as used herein is any substance that imparts color to another material or mixture. Colorants are either dyes or pigments, and may either be (1) naturally present in a material, (2) admixed with it mechanically, or (3) applied to it in a solution.

There may be no generally accepted distinction between dyes and pigments. Some have proposed one on the basis of solubility, or of physical form and method of application. Most pigments, so called, are insoluble, inorganic powders, the coloring effect being a result of their dispersion in a solid or liquid medium. Most dyes, on the other hand, are soluble synthetic organic products which are chemically bound to and actually become part of the applied material. Organic dyes are usually brighter and more varied than pigments, but tend to be less stable to heat, sunlight, and chemical effects. The term colorant applies to black and white as well as to actual colors.

Examples of such colorants (i.e., pigments, dyes, etc.) and their commercial sources include, but are not limited to, magenta pigments such as 2,9-dimethyl-substituted quinacridone and anthraquinone dye, identified in the color index as C1 60710, C1 Dispersed Red 15, a diazo dye identified in the color index as C1 26050, C1 Solvent Red 19, and the like; cyan pigments including copper tetra-4-(octadecylsulfonamido) phthalocyanine, copper phthalocyanine pigment, listed in the color index as C1 74160, Pigment Blue, and Anthradanthrene Blue, identified in the color index as C1 69810, Special Blue X-2137, and the like; yellow pigments including diarylide yellow 3,3-dichlorobenzidine acetoacetanilides, a monoazo pigment identified in the color index as C1 12700, C1 Solvent Yellow 16, a nitrophenyl amine sulfonamide identified in the color index as Foron Yellow SE/GLN, C1 Dispersed Yellow 33, 2,5-dimethoxy acetoacetanilide, Permanent Yellow FGL, and the like. Other suitable colorants include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G0 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich, Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Examples of black pigments include carbon black products from Cabot corporation, such as Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls 520, Black Pearls 490, Black Pearls 480, Black Pearls 470, Black Pearls 460, Black Pearls 450, Black Pearls 430, Black Pearls 420, Black Pearls 410, Black Pearls 280, Black Pearls 170, Black Pearls 160, Black Pearls 130, Black Pearls 120, Black Pearls L; Vulcan XC72, Vulcan PA90, Vulcan 9A32, , Regal 660, Regal 400, Regal 330, Regal 350, Regal 250, Regal 991, Elftex pellets 115, Mogul L.

Carbon black products from Degussa-Hüis such as FW1, Nipex 150, Printex 95, SB4, SB5, SB100, SB250, SB350, SB550; Carbon black products from Columbian such as Raven 5750; Carbon black products from Mitsubishi Chemical such as #25, #25B, #44, and MA-100-S can also be utilized.

Other black pigments that may also be used include Ferro™ 6330, a manganese ferrite pigment available from Ferro Corporation, and Paliotol Black 0080 (Aniline Black) available from BASF.

Moreover, one or more processing aid, such as surface active agents and dispersants aids like Aerosol™ OT-100 (from American Cynamid Co. of Wayne, N.J.) and aluminum octoate (Witco). Dispersant aids such as X-5175 (from Baker-Petrolite Corporation), Unithox™ 480 (from Baker-Petrolite Corp.), Polyox™ N80 (Dow), and Ceramer™ 5750 (Baker-Petrolite Corp.) can also be added to the waxy base material.

Once the high temperature bichromal balls are produced by the process set forth above, they may be encapsulated for use in high temperature display applications. Generally, the encapsulation process involves providing a silicone oil which as previously noted can be polydimethylsiloxane. A shell material as described in the art is also provided. The high temperature bichromal balls, i.e. those utilizing the purified polyalkylene wax, are then encapsulated. The bichromal balls are dispersed in the silicone oil within a shell of the shell material.

Generally, the present exemplary embodiment can be extended to the purification of any polyalkylene wax, and particularly polyethylene wax. Although nearly any polyethylene wax can be used, typically a wax having a melting point of from about 100° C. to about 150° C. is used, and particularly from about 113° C. to about 126° C. The present exemplary embodiment also utilizes one or more solvent extractions of the wax with one or more isoparaffin solvents, to produce a purified wax. The purified wax, when used in a bichromal ball manufacturing process, enables the formation of bichromal balls that are particularly well adapted for high temperature applications.

A series of trials were performed to further investigate this discovery. In Example 1, extraction of PW2000 (SM151C) was performed as follows. 50 g of powdered PW2000 was suspended in 500 ml ISOPAR® C. The mixture was heated to 80° C. for 4 hours, followed by a hot filtration. The filtered solid was dried under suction for 5 minutes and then re-suspended in 500 ml ISOPAR® C for a second hot extraction at 80° C. This procedure was repeated for a total of three extractions. The filtrates in these three extractions were cooled to room temperature and white solids were formed inside the filtrates. These white solids were collected by suction, dried at 80° C. for overnight. The weight and DSC were recorded on these white residues. In addition, the DSC of regular PW2000 and purified PW2000 were also recorded.

The mass of extracted residue was as follows:
After 1st extraction, residue mass=1.75 g
After 2nd extraction, residue mass=0.43 g
After 3rd extraction, residue mass=0.15 g
Total mass extracted=2.33 g which is about 4.6% of parent weight.

In another example, Example 2, black pigmented wax beads (Sm154A) were prepared as follows. 55.72 g of purified PW2000 was melted at 140° C. 0.28 g of Polyox™ N80 (Dow) additive was then added, followed by 14 g Ferro 6331 black pigment. The mixture was homogenized for 30 minutes at 145-150° C. The melted wax was used to make monochrome beads by a modified benchtop spinner.

A characterization was performed. From the DSC shown in FIG. 1, there is a small broad peak of around 90 to 110° C. in the parent PW2000. After the first extraction, the residue showed a clear melting characteristic of low molecular weight POLYWAX® which melts around 100 to 110° C. At the same time, after the third extraction, this small broad peak is not clearly seen in the purified PW2000.

Next, leaching was performed as follows. 1.5 g of monochrome beads were mixed with silicone fluid available from Dow Corning under the designation DC200 1cSt fluid (5 ml). The mixture was heated inside a 80° C. oven for 3 hours and then cooled back to room temperature. A first vial containing regular PW2000 black bead and another vial containing purified PW2000 bead were collected. The white precipitate material in the first vial was the leached material which was not found in the other vial.

The present discovery also relates to a purification process for obtaining a refined polyalkylene wax such as polyethylene wax, and specifically, POLYWAX. Specifically, it has been successfully demonstrated to provide a large scale (50 kg) extraction procedure. This procedure is scaleable. This purification step not only provides a solution to the high temperature Gyricon problem, but also enables the alleviation of the batch-to-batch variability of POLYWAX from Baker Petrolite. This batch-to-batch variability results in significant expenditures of time in determining optimum spinning conditions for forming bichromal balls. The root cause is the change in the distribution of molecular weight of POLYWAX. With the implementation of the noted purification step, it is possible to narrow the molecular weight distribution from about Mn=2022, Mw=2434 with PDI=Mw/Mn=1.30 to Mn=2019, Mw=2248 with PDI=1.12, which leads to elimination of the wax variability problem. The extracted material has a molecular weight distribution of Mn=1064, Mw=1233 with PDI=1.16.

The following process describes production of bichromal Gyricon beads with purified POLYWAX 2000.

Step 1: 150-gallon Polywax 2000 Extraction Process 50 kg Polywax 2000 (Baker Petrolite) and 292 kg Ashpar C (Ashland) were charged into a 150-gallon Cogeim filter-dryer that was fitted with a 0.5 um Gortex filter cloth. Mixing was started at 30 RPM, the filter-dryer was heated to 85° C., and the slurry was mixed for three hours at 85° C. The Ashpar C was filtered off by vacuum, leaving a Polywax 2000 wet cake on the filter cloth. 292 kg fresh Aspar C was charged into the filter-dryer, and the Polywax 2000 wet cake was reslurried by mixing at 30 RPM. The filter-dryer was again heated to 85° C., the slurry was mixed for three hours at 85° C., and the Ashpar C was filtered off by vacuum. The preceding steps were repeated two more times, for a total of four mixing/filtering steps. The remaining Polywax 2000 wet cake was dried at 85° C. for 18 hours in the filter-dryer, and then discharged as a fine white powder. The powder was comilled through a 70-mesh screen to remove lumps. The final product from this procedure will hereafter be referred to as "purified Polywax 2000".

Step 2: White Pigmented Wax Preparation 6 kg purified Polywax 2000 (from step 1) and 2570 g R-104 titanium dioxide (DuPont) were charged into a 5-gallon plastic pail, and the pail was tumbled for 45 minutes on a jar mill. This blend was then fed at 10 pounds per hour through a ZSK-30 extruder with screw speed set at 300 RPM, six temperature zones set at 90° C. and the circular die set at 120° C. The final extruded composite was a white cylindrical solid and will hereafter be referred to as "white pigmented wax."

Step 3: Black Pigmented Wax Preparation 6 kg purified Polywax 2000, 1510 g F-6331-2 Black Pigment (Ferro Corp.), and 28.26 g Polyox™ N80 additive (Baker Petrolite) were charged into a 5-gallon plastic pail and tumbled for 45 minutes on a jar mill. This blend was then fed at 10 pounds per hour through a ZSK-30 extruder with screw speed set at 300 RPM, six temperature zones set at 90° C. and the circular die set at 120° C. The final extruded composite was a black cylindrical solid and will hereafter be referred to as "black pigmented wax."

Step 4: Bichromal Bead Production 1.2 kg white pigmented wax (from step 2) was charged into a Dyanatec Dynamelt, melter-feeder, heated to 155° C., and mixed by hand until melted. 1.2 kg black pigmented wax (from Step 3) was charged into a separate Dyanatec Dynamelt melter-feeder, heated to 155° C., and mixed by hand until melted. When both pigmented waxes were melted, they were fed at 40 g/minute through hoses heated to 135-160° C., through a nozzle heated to 135-160° C., and onto a stainless steel disk (10 cm diameter; 10-mil thickness) rotating at 3900 RPM. The black and white pigmented waxes were metered onto opposite sides of the spinning disk, resulting in production of spherical bichromal beads (i.e., half white, half black). The final bichromal bead product had a wide particle size distribution, and the beads were classified by sieve to retain those in the size range 75 um to 106 um (about 50 wt% of overall product). The final product will hereafter be referred to as "purified Gyricon beads."

Figure 2:
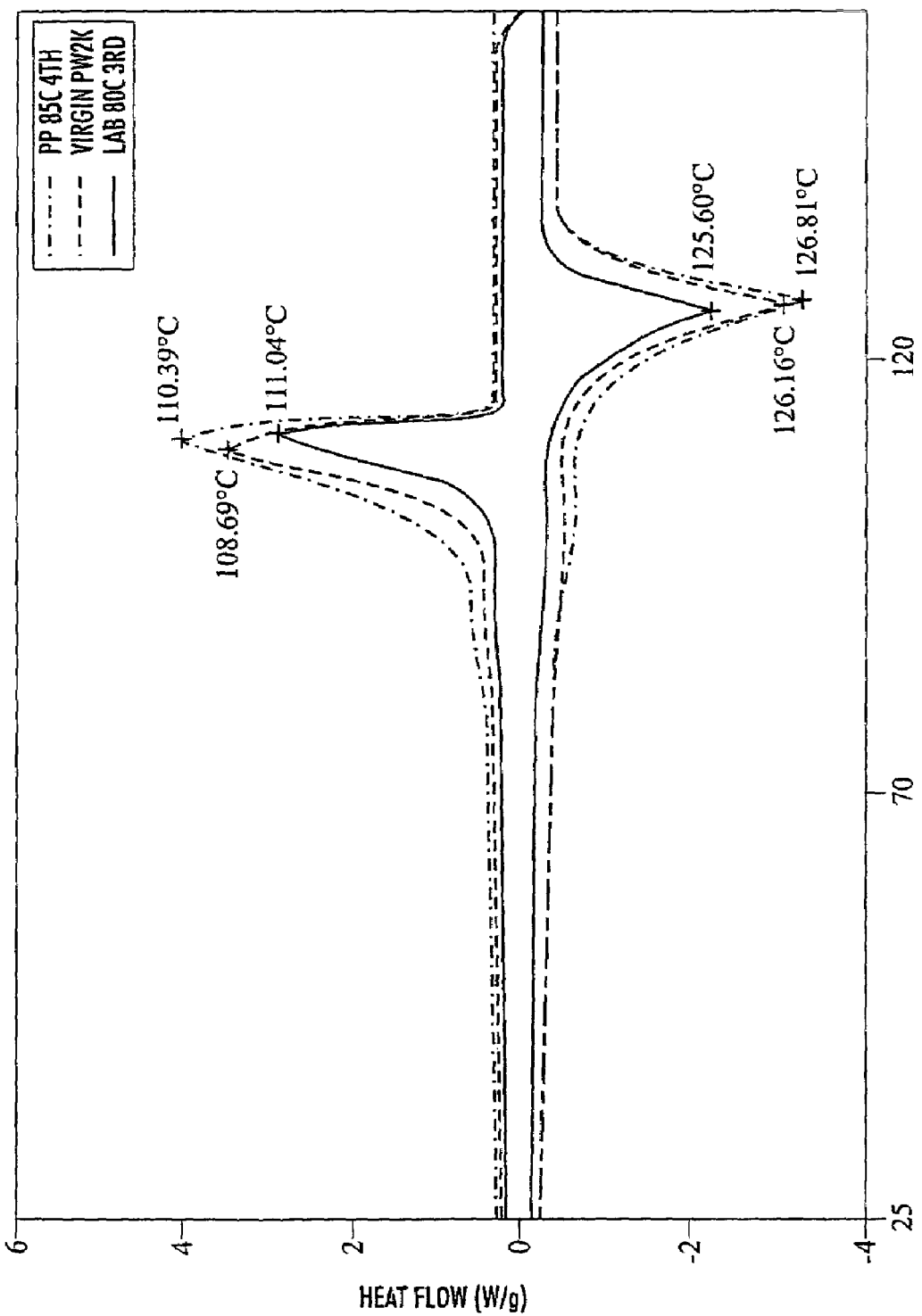
FIG. 2 is a graph of heat flow as a function of temperature for another polyalkylene wax undergoing an extraction operation as described herein.

In a trial addressing scale-up of the present discovery process, FIG. 2 illustrates three different samples tested by DSC: virgin PW2000, pilot plant purified PW2000 and bench-scale PW2000. The DSC traces are shown in FIG. 2.

The virgin PW2000 exhibits a broad endothermic event from 90 to 110° C. which is significantly greater than either one of both purified samples. In addition, the pilot plant sample shows a more silent feature than the bench scale sample. Therefore, the pilot plant sample is more pure than bench scale one.

The following describes fabrication of a device using bichromal balls formed from purified POLYWAX.

Fabrication of Gyricon Sheet (Sample AA569): Sylgard 184 mixture (1.5:10 curing/resin, Dow Corning) was mixed together followed by addition of the same weight of Gyricon beads. After removing the bubbles, the mixture was spread over a carrier substrate sheet, then cured at 90° C. for 2 hrs. Cooling to room temperature occurred, and then a 4 ×6" sheet was subjected to ultrasonic exposure for 10 minutes. The contrast ratio was measured using (ITO-Mylar/Mylar)/PCB pillow configuration.

The results were as follows. Three Gyricon samples made of three different POLYWAXES were tested side by side: PW1000, Unpurified PW2000, and Purified PW2000. PW1000 beads stopped rotating in 1 hour after placement in an oven at 78° C. Unpurified PW2000 CR stopped rotating after 48 hours and Purified PW2000 sustained its CR. See Tables 9 and 10 below.

TABLE 9

| Unpurified PW2000 | | | | |
|---|---|---|---|---|
| AA531, XRCC531 | 60 V | 80 V | 100 V | 125 V |
| Time zero | 2.13 | 3.45 | 4.31 | 4.49 |
| 48 hours | 1.16 | 1.34 | 1.55 | 1.86 |

TABLE 10

| Purified PW2000 | | | | |
|---|---|---|---|---|
| AA569, XRCC94 | 60 V | 80 V | 100 V | 125 V |
| Time zero | 3.67 | 3.91 | 3.76 | 3.57 |
| 48 hours | 3.55 | 3.64 | 3.56 | 3.40 |
| 120 hours | 3.26 | 3.60 | 3.60 | 3.50 |

No optical performance degradation was observed in purified PW2000 Gyricon devices after cycling at 78° C. over 120 hours. Interestingly, the unpurified PW2000 devices rotated much better at 780° than at room temperature. This is consistent with the "precipitation model" for CR loss in this system, i.e. soluble polywax precipitates out in the capsule thereby inhibiting room temperature bead rotation.

Prior to the present discovery, Gyricon devices typically exhibited a 40° C. upper limit operating temperature. Therefore, such devices were generally only used for the indoor signage market. In order to provide outdoor signage, external cooling units were often required which is costly and hampers large scale testing. By utilizing 'purified' PW2000, high quality bichromal Gyricon beads are successfully prepared. Devices of 'purified' Gyricon bead have shown superior high temperature tolerance. This new package of materials can significantly expand the operating limits of Gyricon devices.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for forming bichromal balls adapted for display applications at temperatures greater than 40° C., said process comprising: providing a polyethylene wax having a molecular weight distribution of about 200 to about 3000; providing an isoparaffin solvent; extracting said polyethylene wax with said isoparaffin solvent to remove a fraction of said polyethylene wax from a remaining purified portion of said polyethylene wax, said fraction having an average molecular weight of less than 700; and forming bichromal balls adapted for display applications at temperatures greater than 40° C. from said purified portion of said polyethylene wax, wherein said forming of the bichromal balls from said purified polyethylene wax includes: mixing said purified polyethylene wax with a first pigment to produce a first wax material; mixing said purified polyethylene wax with a second pigment to produce a second wax material; heating said first wax material to a temperature greater than the melting temperature of said first wax material; heating said second wax material to a temperature greater than the melting point of the second wax material; depositing said heated first wax material and said second wax material onto a spinning disk to produce bichromal balls adapted for use in display applications at temperatures greater than 40° C.

2. The process of claim 1, wherein said polyethylene wax has a melting point of about 100° C. to about 150° C.

3. The process of claim 1, wherein said polyethylene wax has a melting point of from about 113° C. to about 126° C.

4. The process of claim 1, wherein said extraction is performed a number of times, said number selected from the group consisting of 1, 2, 3, 4, and 5 times.

5. The process of claim 1, wherein said extraction is performed at an elevated temperature.

6. The process of claim 1, wherein said extraction is performed at a temperature of about 80° C.

7. The process of claim 1 further comprising:
providing a silicone fluid;
providing a shell material;
encapsulating said bichromal balls and said silicone oil within a shell of said shell material.

* * * * *